US012783153B2

(12) United States Patent
Mohanty et al.

(10) Patent No.: US 12,783,153 B2
(45) Date of Patent: Nov. 3, 2026

(54) AUTOMATED DATA ARCHIVAL FRAMEWORK USING ARTIFICIAL INTELLIGENCE TECHNIQUES

(71) Applicant: Dell Products L.P., Round Rock, TX (US)

(72) Inventors: Bijan Kumar Mohanty, Austin, TX (US); Barun Pandey, Bangalore (IN); Sabu K. Syed, Austin, TX (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 814 days.

(21) Appl. No.: 17/971,082

(22) Filed: Oct. 21, 2022

(65) Prior Publication Data

US 2024/0134562 A1 Apr. 25, 2024
US 2024/0231678 A9 Jul. 11, 2024

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/0605; G06F 3/067; G06F 3/0685; G06F 3/0649
See application file for complete search history.

(56) References Cited

U.S. PATENT DOCUMENTS

| | | | | |
|---|---|---|---|---|
| 10,938,723 | B2 | 3/2021 | Thanasekaran | |
| 11,017,053 | B2 | 5/2021 | Nelson | |
| 11,238,173 | B2 | 2/2022 | Iyer et al. | |
| 2019/0362271 | A1* | 11/2019 | Kambadahalli Puttasetty | G06N 5/04 |
| 2021/0049418 | A1* | 2/2021 | Zhao | G06N 3/0895 |
| 2021/0117395 | A1* | 4/2021 | Wang | G06F 21/53 |
| 2021/0141698 | A1* | 5/2021 | Bourgeois | G06F 16/353 |
| 2022/0019872 | A1* | 1/2022 | Lei | G06N 3/084 |
| 2022/0107974 | A1* | 4/2022 | Kumar | G06N 20/00 |

OTHER PUBLICATIONS

Breiman et al., "Random Forests," in 45.1 Machine Learning 5-32 (2001). (Year: 2001).*

* cited by examiner

*Primary Examiner* — Ryan C Vaughn
(74) *Attorney, Agent, or Firm* — Ryan, Mason & Lewis, LLP

(57) ABSTRACT

Methods, apparatus, and processor-readable storage media for implementing an automated data archival framework using artificial intelligence techniques are provided herein. An example computer-implemented method includes obtaining data associated with one or more storage systems; determining one or more storage-related features within the obtained data by processing at least a portion of the obtained data; predicting at least one data archival class, from a set of multiple predetermined data archival classes, for at least a portion of the obtained data by processing the one or more storage-related features using one or more artificial intelligence techniques; and performing one or more automated actions based at least in part on the at least one predicted data archival class.

20 Claims, 12 Drawing Sheets

*FIG. 6*

600

```
import numpy as np
import pandas as pd
from sklearn.model_selection import train_test_split
from sklearn.ensemble import RandomForestClassifier
from sklearn.metrics import accuracy_score
from sklearn.metrics import confusion_matrix
from sklearn.tree import DecisionTreeClassifier
from sklearn.preprocessing import LabelEncoder
from sklearn import tree

# import warnings filter
from warnings import simplefilter
# ignore all future warnings
simplefilter(action='ignore', category=FutureWarning)
```

*FIG. 7*

700

```
transaction_data = pd.read_csv("data/database_transaction.csv",  sep= ',', header= None)

X = transaction_data.values[:, 1:6]
Y = transaction_data.values[:, 0]

# Encode the categorical values by using Label Encoding
X = LabelEncoder().fit_transform(X)
Y = LabelEncoder().fit_transform(Y)

# Split the data into training (70%) and testing (30%) sets
x_train, x_test, y_train, y_test = train_test_split( X, Y, test size = 0.3, random_state = 42)
```

FIG. 8

800

```
# Train model using training data
trained_model = RandomForestClassifier(criterion= 'entropy')
trained_model.fit(x_train, y_train)

predictions = trained_model.predict(X_test)

# Train and Test Accuracy
print("Train Accuracy :: ", accuracy_score(y_train, trained_model.predict(X_train)))
print("Test Accuracy :: ", accuracy_score(y_test, predictions))
print("Confusion matrix ", confusion_matrix(y_test, prediction))
```

FIG. 10

1000

```
# reading the historical data file into pandas dataframe
dataarchival_df = pd.read_csv("database_archival_class.csv") # Read the historical archival class of the database
```

FIG. 11

1100

```
# Encode the categorical values by using Label Encoding
from sklearn.preprocessing import LabelEncoder

dataarchival_df = LabelEncoder().fit_transform(dataarchival_df)
```

FIG. 12

1200

```
from sklearn.preprocessing import StandardScaler
scalar = StandardScaler()
dataarchival_scaled = pd.DataFrame(scalar.fit_transform(dataarchival_df), columns=dataarchival_df.columns)

from sklearn.decomposition import PCA

dataarchival_pca = pd.DataFrame(pca.fit_transform(dataarchival_scaled))
```

1300

```
# Split Training and Testing data sets
#First get the independent variables and dependent variable separated
features = [col for col in dataarchival_pca.columns if col != 'ArchivalClass']

x_train, x_test, y_train, y_test = train_test_split(dataarchival_pca[features], dataarchival_pca['ArchivalClass'],
                                                    test_size=.3, random_state=42)
```

*FIG. 13*

FIG. 14

1400

```
# Using Tensorflow Keras® to create the Dense Neural Network model for multi-class Classification

from tensorflow.keras import Sequential
from tensorflow.keras.layers import Dense

# Initialize the constructor
model = Sequential()

# Add a first hidden layer for the 19 input variables
model.add(Dense(32, input_shape = (19,), activation='relu', kernel_initializer='normal'))

# second hidden layer
model.add(Dense(16, activation='relu', kernel_initializer='normal'))

# Add an output layer with four neurons to match the four classes of storage tier and softmax activation
model.add(Dense(4, activation='softmax'))

# set the loss function and optmizer
model.compile(loss='categorical_crossentropy', optimizer='adam', metrics='accuracy')
```

1500

```
# Train the model with the training data
history = model.fit(X_train, y_train.values, validation_split=0.2,
                    epochs=100, batch_size=500, verbose=1)

# Evaluate the loss value of the model using Test data
loss = model.evaluate(X_test, y_test, verbose=False)

# Predict the expected outcome from the model
y_predict = model.predict(X_test)
```

AUTOMATED DATA ARCHIVAL FRAMEWORK USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for data storage in such systems.

BACKGROUND

Data archival methodology commonly includes database management techniques to transfer data across storage components such as, for example, from more expensive data storage components to less expensive data storage components. However, conventional data archival approaches include the use of static rules in connection with a set of archival components. Such conventional approaches are reactive in nature, as any changes to archiving strategy must be carried out manually, leading to resource-intensive and error-prone processes.

SUMMARY

Illustrative embodiments of the disclosure provide techniques for implementing an automated data archival framework using artificial intelligence.

An exemplary computer-implemented method includes obtaining data associated with one or more storage systems, and determining one or more storage-related features within the obtained data by processing at least a portion of the obtained data. The method also includes predicting at least one data archival class, from a set of multiple predetermined data archival classes, for at least a portion of the obtained data by processing the one or more storage-related features using one or more artificial intelligence techniques. Additionally, the method includes performing one or more automated actions based at least in part on the at least one predicted data archival class.

Illustrative embodiments can provide significant advantages relative to conventional data archival approaches. For example, problems associated with resource-intensive and error-prone processes are overcome in one or more embodiments through automatically determining and performing data archival-related actions using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 6 shows example pseudocode for importing libraries for building a data archival class prediction engine in an illustrative embodiment.

FIG. 7 shows example pseudocode for processing historical database transaction data in an illustrative embodiment.

FIG. 8 shows example pseudocode for training and testing a random forest classifier in an illustrative embodiment.

FIG. 10 shows example pseudocode for data preprocessing in an illustrative embodiment.

FIG. 11 shows example pseudocode for encoding categorical values into numerical values in an illustrative embodiment.

FIG. 12 shows example pseudocode for reducing dimensionality of a dataset in an illustrative embodiment.

FIG. 13 shows example pseudocode for splitting a dataset into training and testing sets in an illustrative embodiment.

FIG. 14 shows example pseudocode for creating a dense neural network model for multi-class classification in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
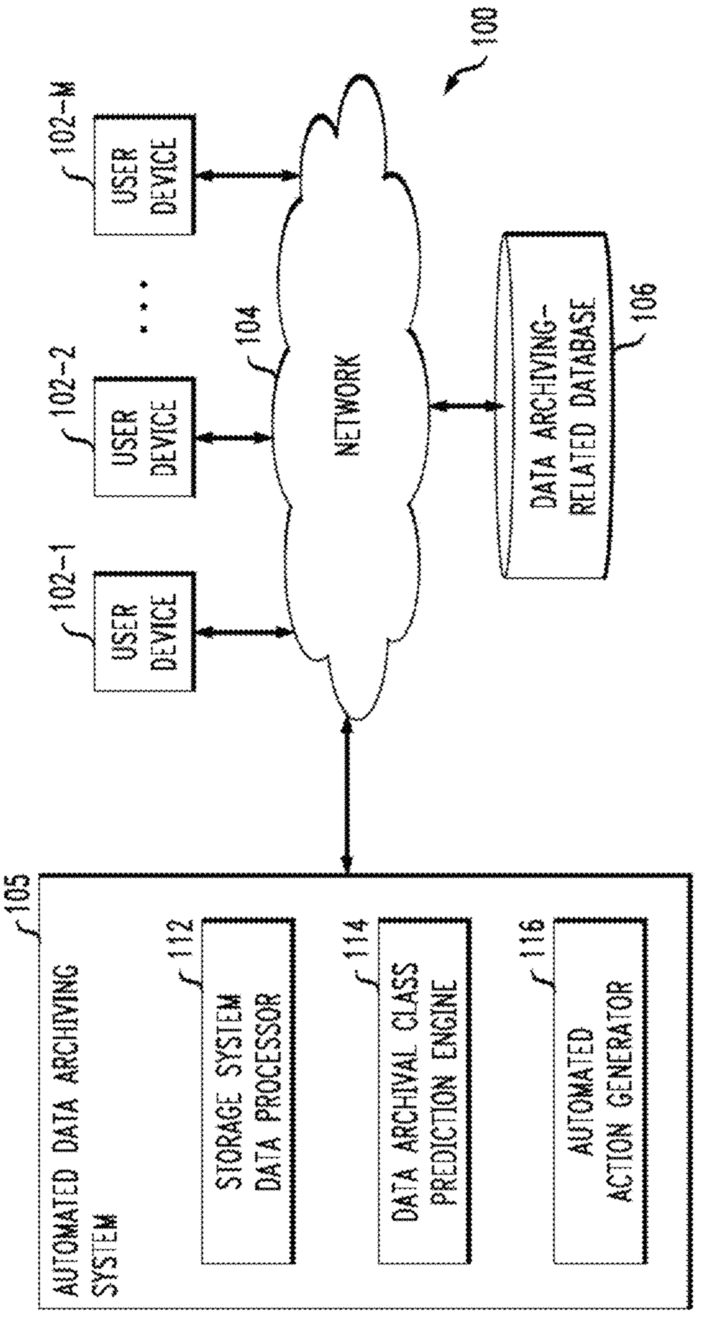
FIG. 1 shows an information processing system configured for implementing an automated data archival framework using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated data archiving system 105.

The user devices 102 may comprise, for example, mobile telephones, laptop computers, tablet computers, desktop computers or other types of computing devices and/or storage systems. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi® or WiMAX® network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated data archiving system 105 can have an associated data archiving-related database 106 configured to store data pertaining to data archival, which comprise, for example, database transactions, storage-related features, data archival classes, storage-related policies, etc.

The data archiving-related database 106 in the present embodiment is implemented using one or more storage systems associated with automated data archiving system 105. Such storage systems (and/or storage systems encompassed within and/or represented by user devices 102) can comprise any of a variety of different types of storage including network-attached storage (NAS), storage area networks (SANs), direct-attached storage (DAS) and distributed DAS, as well as combinations of these and other storage types, including software-defined storage.

Also associated with automated data archiving system 105 is one or more input-output devices, which illustratively comprise keyboards, displays or other types of input-output devices in any combination. Such input-output devices can be used, for example, to support one or more user interfaces to automated data archiving system 105, as well as to support communication between automated data archiving system 105 and other related systems and devices not explicitly shown.

Additionally, automated data archiving system 105 in the FIG. 1 embodiment is assumed to be implemented using at least one processing device. Each such processing device generally comprises at least one processor and an associated memory, and implements one or more functional modules for controlling certain features of automated data archiving system 105.

More particularly, automated data archiving system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated data archiving system 105 to communicate over the network 104 with the user devices 102, and illustratively comprises one or more conventional transceivers.

The automated data archiving system 105 further comprises storage system data processor 112, data archival class prediction engine 114, and automated action generator 116.

It is to be appreciated that this particular arrangement of elements 112, 114 and 116 illustrated in the automated data archiving system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for implementing an automated data archival framework using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated data archiving system 105 and data archiving-related database 106 can be on and/or part of the same processing platform.

An exemplary process utilizing elements 112, 114 and 116 of an example automated data archiving system 105 in computer network 100 will be described in more detail with reference to the flow diagram of FIG. 16.

Accordingly, at least one embodiment includes generating and/or implementing at least one artificial intelligence-based data archival framework. Such an embodiment includes processing retention and/or disposition requirements associated with data archival by leveraging one or more machine learning models in connection with historical data and monitoring data. Such processing can include, for example, recommending one or more specific tiering and consolidation templates and/or formats applicable for the context of data archival and automatically executing at least a portion of the recommendations.

Additionally, in at least one embodiment, an archival decision engine can leverage one or more algorithms to verify previously executed policies and compare historical values related thereto. Such prediction and/or decision capabilities can facilitate building an intelligent data archival framework across at least one enterprise.

One or more embodiments include recognizing and/or identifying sensitive data such as, for example, personally identifiable information (PII), intellectual property, etc., assigning a value to each such item of sensitive data, and providing visibility into where such items of sensitive data are stored and how at least a portion of such data is being used. Such an embodiment can also include continuously monitoring data access activity for one or more anomalies and delivering alerts upon detection of one or more risks of unauthorized access and/or inadvertent data leaks.

Also, at least one embodiment includes analyzing one or more user data requests using one or more knowledge engines, wherein such engines receive the latest monitoring data, for example, from at least one external monitoring system. At least a portion of the received data (e.g., all of the received data) is used by the one or more engines during the knowledge analysis. In one or more embodiments, such knowledge analysis includes determining which type(s) of PII data is/are being requested and which entity or entities are making the request(s). Such determinations are achieved by monitoring the data transactions and classifying and/or identifying the data elements as PII and building knowledge on the utilizations thereof. In such analysis, each of the knowledge engines attempts to identify the best solution of a group of possible best solutions, wherein such solutions can include one or more actions. The actions can involve, for example, determining which data transactions that involve PII data should be accessible to which consumers.

As detailed herein, one or more embodiments include implementing a proactive, intelligent approach to data archival techniques by leveraging one or more artificial intelligence techniques as well as historical database transactions and corresponding performance metrics along with a set of data archival classes. The one or more artificial intelligence techniques can include at least one machine learning-based multi-class classification model that is trained using the historical database transactions and corresponding performance metrics, which can recommend at least one archival class (e.g., an optimal archival class) for given data.

Such an embodiment includes utilizing historical operations data on various storage systems (including, for example, databases) and extracting at least one multidimensional feature set for training data. At least one machine learning algorithm is then leveraged and trained using at least a portion of the extracted features to classify a given storage system's archival methodology for optimal storage. As such, one or more embodiments includes utilizing a machine learning-based classifier to recommend at least one storage archival class (e.g., the optimal storage class) that fits a given database operation from one or more perspectives (e.g., an efficiency perspective and/or a cost perspective). Based on the recommendation, a decision can be made (e.g., made in conjunction with one or more data engineers) to formulate a given archival system for each data storage platform. As used herein, an archival methodology refers to a process wherein data are moved to at least one storage system (e.g., a low(er) cost storage system for storing data for long(er) period when the frequency of access to the data is low and/or decreasing). Also, data storage platforms refer to a class of storage that includes multiple types of storage including, for example, high performance, expensive, low latency storage, as well as other types of storage that involve low frequency access, inexpensive storage, etc.

As part of one or more embodiments, data pertaining to database operations, corresponding performance metrics, the type of databases, and the archival methodology class are collected from historical data access logs and/or audits. Feature extraction is then carried out, which involves identification of one or more features that can influence the outcome and one or more features that do not influence the outcome. Accordingly, unnecessary features can be dropped and/or removed from the data to reduce dimensionality and help in the performance and accuracy of model training and prediction.

Figure 2:
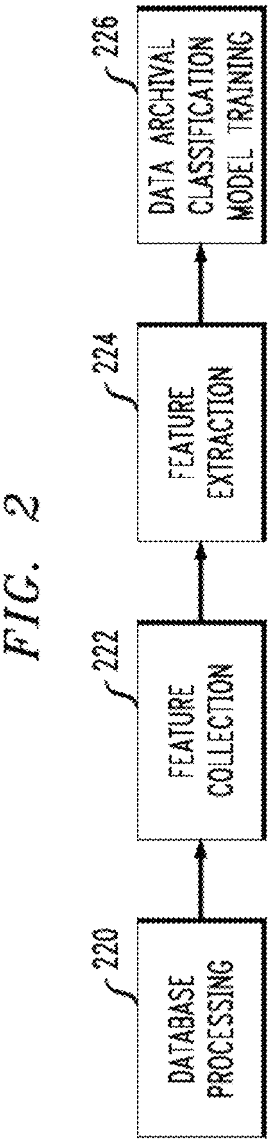
FIG. 2 shows an example process flow for data archival classification from database transactions in an illustrative embodiment.

FIG. 2 shows an example process flow for data archival classification from database transactions in an illustrative embodiment. By way of illustration, FIG. 2 depicts a process of collecting database activities by processing database data in step 220, identifying, in step 222, a collection of one or more features from the database processing, extracting one or more of the features in step 224, and training, using the extracted feature(s), a machine learning classifier for predicting optimal archival classes in step 226. Such steps depicted in FIG. 2 are further detailed, for example, in connection with FIG. 3 below.

Figure 3:
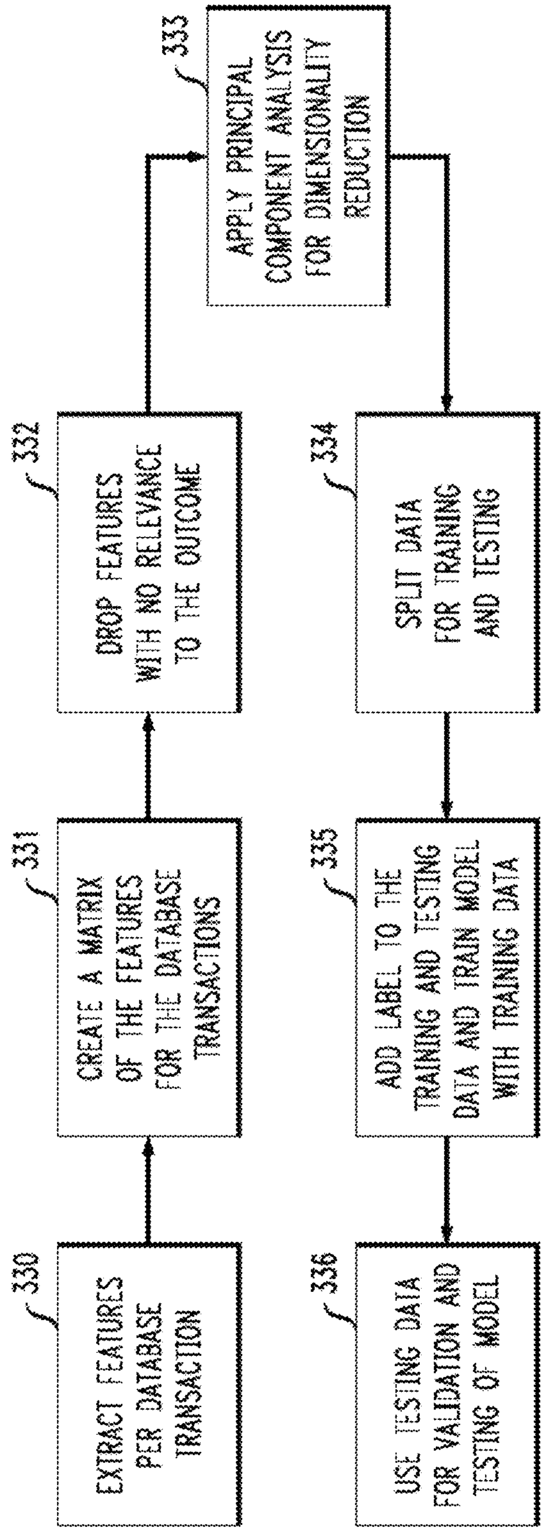
FIG. 3 shows an example workflow for training and testing a model in an illustrative embodiment.

FIG. 3 shows an example workflow for training and testing a model in an illustrative embodiment. By way of illustration, database transactions are harvested from one or more databases (e.g., a set of databases within a given enterprise) and one or more transaction features (e.g., create, read, update, delete (CRUD) operations) are extracted per transaction in step 330. Subsequently, a matrix of at least a portion of the extracted features of the transactions (e.g., a matrix of all of the extracted features from all the transactions) is created in step 331. At this point, in one or more embodiments, any feature that has limited relevance and/or importance to the influencing variable is deleted (e.g., removed from the matrix) in step 332. Relevancy can be computed, for example, by creating at least one heatmap and/or conducting exploratory data analysis such as a bivariate plot analysis.

Additionally or alternatively, once features are extracted, dimensionality reduction of the dataset can be conducted by leveraging principal component analysis (PCA) in step 333. After dimensionality reduction, the remaining data are split into at least one training dataset and at least one testing dataset in step 334. Labels are added to at least a portion of the training and testing datasets in step 335, wherein such labels can include the type of archival class used. Once models are trained using the at least one labeled training dataset, the at least one testing dataset is used for validation and testing of the models in step 336.

In the feature extraction stage, one or more of the features extracted from database transaction data can include the database type (e.g., relational, NoSQL, etc.), usage type (production, non-production, etc.), transaction type, transaction complexity, cost/time taken, memory utilization, CPU utilization, disk utilization, full table scanned or not, total joins, number of rows accessed, number of rows used, etc.

At least one embodiment includes leveraging both shallow learning techniques and deep learning techniques to build one or more classification models for prediction, wherein the use of both shallow learning techniques and deep learning techniques helps in deciding on the model(s) based at least in part on the accuracy and the performance of the model(s).

In such an embodiment, shallow learning techniques are implemented, for example, when there is less data dimensionality and fewer efforts are expected for training the model. As a shallow learning example, an ensemble bagging technique with a random forest algorithm can be utilized as a multi-class classification approach for predicting the data archival class for a given request and/or operation.

In one or more embodiments, a random forest algorithm is chosen for prediction and recommendation based at least in part on the algorithm's efficiency and accuracy in connection with processing large volumes of data. Random forest algorithms can include using bagging or bootstrap aggregating techniques to generate predictions, which includes using multiple classifiers (e.g., in parallel), each trained on different data samples and/or different features. Such techniques can reduce the variance and/or the bias from using a single classifier, and the final classification can be achieved by aggregating the predictions that were made by the different classifiers.

Figure 4:
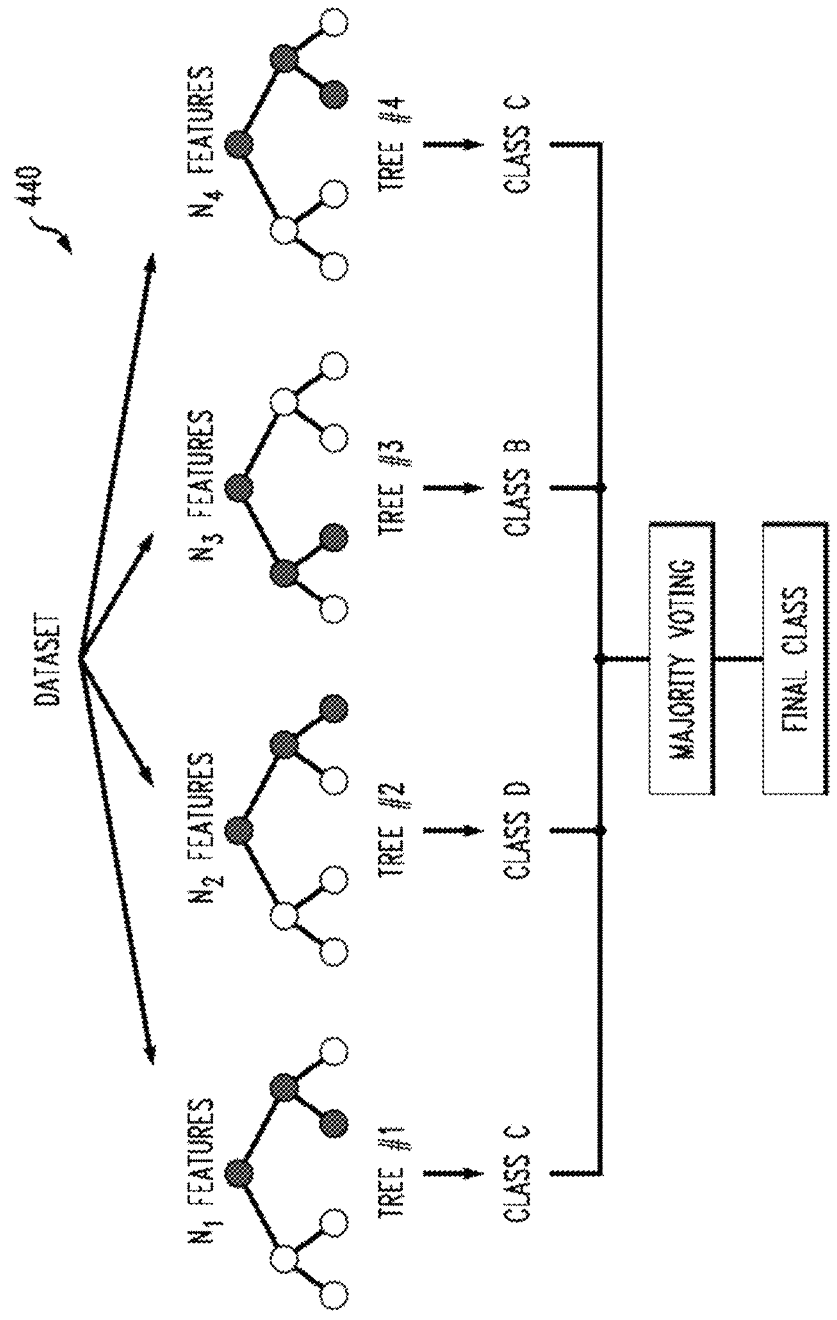
FIG. 4 shows an example random forest classifier structure in an illustrative embodiment.

FIG. 4 shows an example random forest classifier structure 440 in an illustrative embodiment. By way of illustration, FIG. 4 depicts an example random forest which includes multiple decision trees (e.g., Tree #1, Tree #2, Tree #3, and Tree #4), and each decision tree is constructed using different features (e.g., $N_1$ features, $N_2$ features, $N_3$ features, and $N_4$ features, respectively) and different data samples from a given dataset, which reduces bias and variance. In the training process, the decision trees are constructed using training data, and in the testing process, each prediction to be made runs through the different decision trees, wherein each decision tree yields a predicted class (e.g., Class C, Class D, Class B, and Class C, respectively), and the final prediction (e.g., Final Class) is determined by voting (e.g., which class got the largest number of votes).

As detailed herein, in one or more embodiments, a random forest classifier uses multinomial and/or multi-class classification, wherein the results of the classification would be one of multiple types of classes. In such an embodiment, each class represents a storage class and/or tier, and the model predicts one of the classes (representing an archival methodology) with a corresponding confidence score. As used herein, storage tiers and classes are used synonymously.

In at least one embodiment, multiple independent variables (X values) can include the database type, the database name, usage type, transaction type, transaction complexity, cost and/or latency, CPU utilized, memory utilized, rows accessed, etc., whereas the target variable (Y value) can include the data archival class predicted/recommended by the model.

Figure 5:
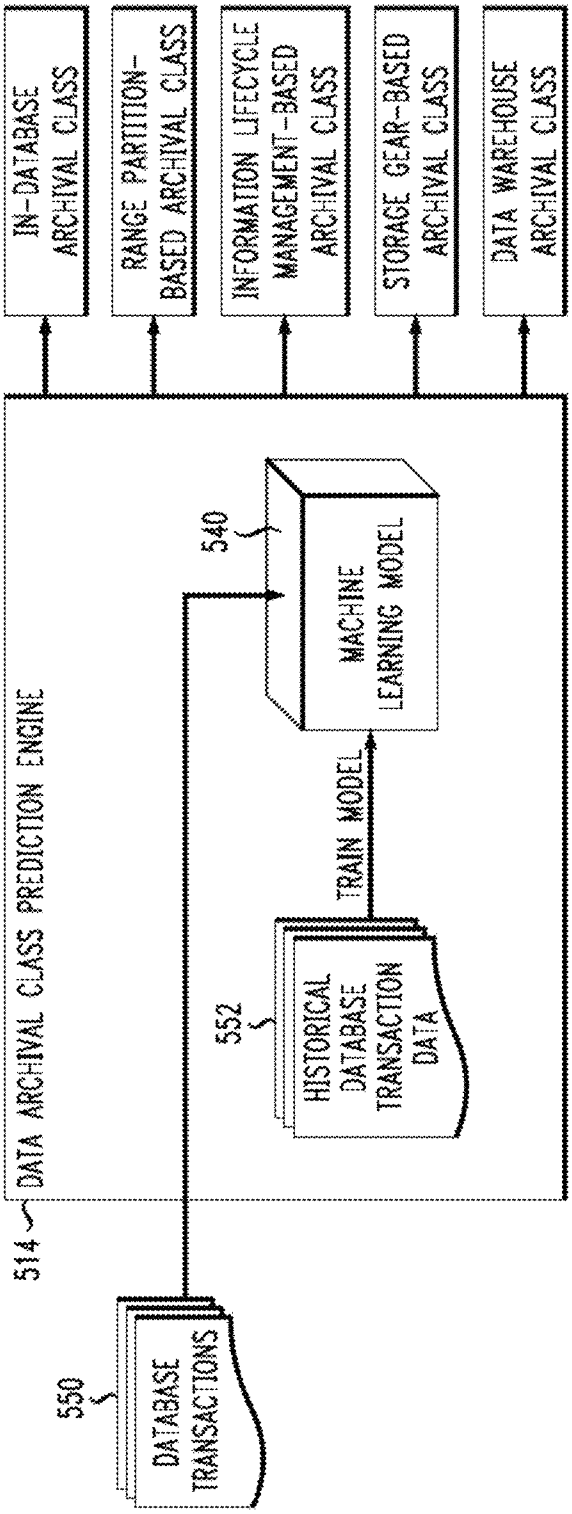
FIG. 5 shows an example data archival class prediction engine in an illustrative embodiment.

FIG. 5 shows an example data archival class prediction engine 514 in an illustrative embodiment. By way of illustration, FIG. 5 depicts historical database transaction data 552 being used to train machine learning model 540 (e.g., a random forest classifier such as depicted in FIG. 4). The machine learning model 540 can then be used to process data pertaining to database transactions 550 to predict one or more archival classes to be initiated and/or implemented in connection with the database transactions 550. By way merely of example, such archival classes can include an in-database archival class, a range partition-based archival class, a commercial off the shelf (COTS) information lifecycle management-based (ILM-based) archival class, a storage gear-based archival class, and a data warehouse archival class.

In one or more embodiments, and as further detailed below, a data archival class prediction engine can be built using one or more SciKitLearn libraries with the Python® programming language.

FIG. 6 shows example pseudocode for importing libraries for building a data archival class prediction engine in an illustrative embodiment. In this embodiment, example pseudocode 600 is executed by or under the control of at least one processing system and/or device. For example, the example pseudocode 600 may be viewed as comprising a portion of a software implementation of at least part of automated data archiving system 105 of the FIG. 1 embodiment.

The example pseudocode 600 illustrates importing the necessary libraries (e.g., SciKitLearn, Pandas, Numpy, etc.), as well as importing at least one warnings filter and ignoring future warnings related thereto.

It is to be appreciated that this particular example pseudocode shows just one example implementation of importing libraries for building a data archival class prediction engine, and alternative implementations can be used in other embodiments.

FIG. 7 shows example pseudocode for processing historical database transaction data in an illustrative embodiment. In this embodiment, example pseudocode 700 is executed by or under the control of at least one processing system and/or device. For example, the example pseudocode 700 may be viewed as comprising a portion of a software implementation of at least part of automated data archiving system 105 of the FIG. 1 embodiment.

The example pseudocode 700 illustrates reading a database transaction history file to create a training data frame. Specifically, in pseudocode 700, the data are created as a comma-separated values (CSV) file and the data are read to a Pandas data frame. The data are then separated into the independent variables or features (X) and the dependent variable or target value (Y) based on the position of the column in the data frame. The categorical data in both the features and the target values are encoded by passing the data to LabelEncoder. Then, the data are split into training and testing sets using a train_test_split function of scikit-learn library. For example, in one or more embodiments, the training set can contain approximately 70% of the observations while the testing set can contain approximately 30%.

It is to be appreciated that this particular example pseudocode shows just one example implementation of processing historical database transaction data, and alternative implementations can be used in other embodiments.

FIG. 8 shows example pseudocode for training and testing a random forest classifier in an illustrative embodiment. In this embodiment, example pseudocode 800 is executed by or under the control of at least one processing system and/or device. For example, the example pseudocode 800 may be viewed as comprising a portion of a software implementation of at least part of automated data archiving system 105 of the FIG. 1 embodiment.

The example pseudocode 800 illustrates creating a random forest classifier using a sklearn library with the criterion hyperparameter as "entropy." Also, the model is trained using the training dataset(s) (such as detailed in connection with FIG. 7), including both the independent variables (X_train) and the target variable (y_train). Once trained, the model is asked to predict by passing the testing data of independent variable (X_test). The predictions, accuracy and confusion matrix are then printed.

It is to be appreciated that this particular example pseudocode shows just one example implementation of training and testing a random forest classifier, and alternative implementations can be used in other embodiments.

Additionally, in one or more embodiments, hyperparameters of the model can be tuned to improve the accuracy of the predictions, and the final model, including all hyperparameters, can finalized after such tuning.

In addition to or as an alternative to use of a random forest classifier, one or more embodiments can include using deep learning techniques to predict optimal data archival classes. Such an embodiment can include implementing deep learning techniques, for example, when there is a significant amount of data with a non-trivial amount of dimensionality involved. In such a situation, at least one embodiment can include leveraging a multi-layer perceptron (MLP) and/or an ANN as a classifier.

Figure 9:
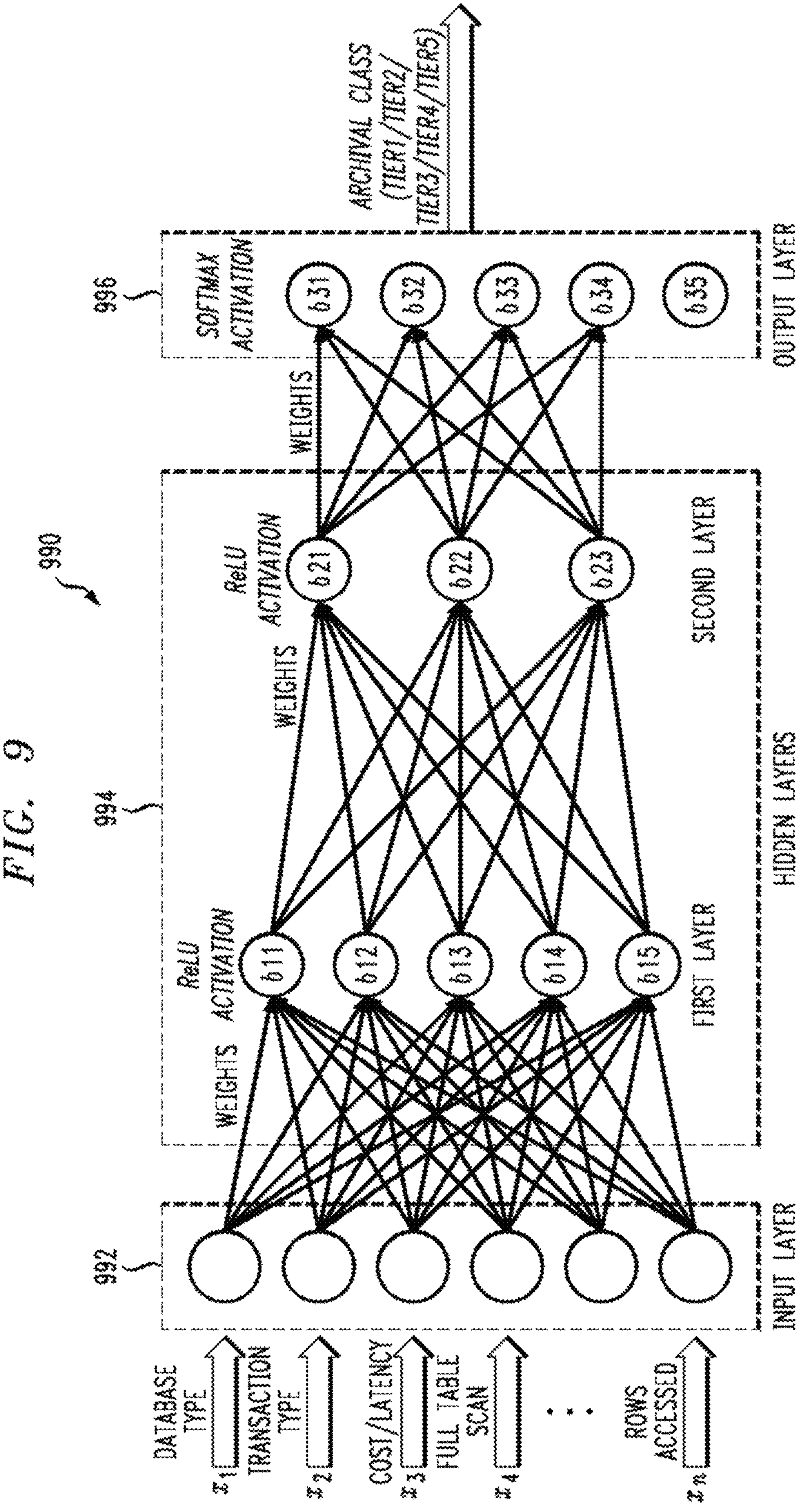
FIG. 9 shows example architecture of a dense artificial neural network-based (ANN-based) classifier in an illustrative embodiment.

FIG. 9 shows example architecture of a dense ANN-based classifier 990 for predicting archival classes in an illustrative embodiment. By way of illustration, dense ANN-based classifier 990 includes input layer 992, hidden layers 994 and output layer 996. Input layer 992 includes a number of neurons that matches the number of input/independent variables (e.g., database type ($x_1$), transaction type ($x_2$), cost/latency ($x_3$), full table scan ($x_4$), . . . rows accessed ($x_n$). Hidden layers 994 includes two layers and the neurons on each layer (e.g., b11, b12, b13, b14, b15, b21, b22, and b23) depend upon the number of neurons in the input layer. The output layer 996 contains five neurons (e.g., b31, b32, b33, b34, and b35) to match the number of data archival classes (e.g., Tier1, Tier2, Tier3, Tier4, and Tier5), as this dense ANN-based classifier is a multi-class classification model.

Within hidden layers 994, although there are five neurons shown in the first layer and three neurons shown in the second layer, it is to be appreciated that this is merely illustrative and that one or more additional embodiments can include different numbers of neurons across different numbers of layers. By way of example, the number of neurons in the hidden layers 994 can depend upon the total number of neurons in the input layer 992. For instance, the number of neurons in a first layer of hidden layers 994 can be calculated based on an algorithm matching the power of two to the number of input layer neurons. For example, if the number of input variables is 19, it falls in the range of $2^5$. That means that the first layer of hidden layers 994 will have $2^5=32$ neurons, and the second layer of hidden layers 994 will contain $2^4=16$ neurons. If there was to be a third layer, the third layer of hidden layers 994 would contain $2^3=8$ neurons.

In one or more embodiments, neurons in the hidden layers 994 and the output layer 996 contain at least one activation function, which drives whether the given neuron will fire or not. In the example dense ANN-based classifier 990, a rectified linear unit (ReLU) activation function is used in the neurons in the hidden layers 994. Also, considering the model is being architected to behave as a multi-class classifier, neurons in the output layer 996 contain a softmax activation function.

Additionally, considering that FIG. 9 depicts a dense ANN, each neuron will connect with each other, each connection has a weight factor (w) and the neurons each have a bias factor. Such weight and bias values are set randomly by the neural network, and such values can be started, for example, as 1 or 0 for all values. Also, in one or more embodiments, each neuron performs a linear calculation by combining the multiplication of each input variable ($x_1$, $x_2$, etc.) with their weight factor, and then adding the bias of the neuron. By way of example, the formula for this calculation can be given as $ws_1=x_1\cdot w_1+x_2\cdot w_2+ \ldots +b1$, wherein $ws_1$ is the weighted sum of neuron1; $x_1$, $x_2$, etc. are the input values to the model; $w_1$, $w_2$, etc. are the weight values applied to the connections to neuron1; and b1 is the bias value of neuron1. This weighted sum is input to an activation function (e.g., ReLU) to compute the value of the activation function. Similarly, weighted sum and activation function values of all other neurons in the given layer are calculated, and these values are fed to the neurons of the next layer. The same process can then be repeated in the next layer's neurons until the values are fed to the neurons of the output layer, which is where the weighted sum is also calculated and compared to the actual target value.

Depending upon the difference, a loss value is calculated. This pass through of the neural network is a forward propagation which calculates the error and drives a backpropagation through the network to minimize the loss or error at each neuron of the network. Considering the error or loss is generated by all of the neurons in the network, backpropagation goes through each layer, from back to front, and attempts to minimize the loss by using at least one gradient descent-based optimization mechanism. Considering that the neural network is used in at least one embodiment such as depicted in FIG. 9 as a multi-class classifier, such an embodiment includes using categorical_crossentropy as loss function, adaptive moment estimation (adam) and/or root mean squared propagation (RMSProp) as an optimization algorithm, and "accuracy" as the given metric.

The result of such a backpropagation is to adjust the weight and bias values at each connection and neuron level to reduce the error or loss. Once all of the observations of the training data are passed through the neural network, an epoch is completed. Another forward propagation is initiated with the adjusted weight and bias values, which is considered as epoch2, and the same process of forward and backpropagation is repeated in one or more subsequent epochs. This process of repeating the epochs results in the reduction of loss to a small number (e.g., close to 0), at which point the neural network is considered to be sufficiently trained for prediction.

The implementation can be achieved, as detailed herein, by using Keras® with TensorFlow® backend, Python® language, as well as Pandas, Numpy and SciKitLearn libraries.

FIG. 10 shows example pseudocode for data preprocessing in an illustrative embodiment. In this embodiment, example pseudocode 1000 is executed by or under the control of at least one processing system and/or device. For example, the example pseudocode 1000 may be viewed as comprising a portion of a software implementation of at least part of automated data archiving system 105 of the FIG. 1 embodiment.

The example pseudocode 1000 illustrates reading the dataset of the database transaction metrics from at least one historical data repository into a Pandas data frame. The data frame contains columns for all independent variables and a column for the dependent/target variable (e.g., archival class/type). An initial data preprocessing step can include handling any null or missing values in the columns, wherein, for example, null or missing values in numerical columns can be replaced by the median value of that column. After carrying out an initial data analysis by creating some univariate and bivariate plots of these columns, the importance and influence of each column can be understood and/or determined. Columns that have no role or influence on the actual prediction (target variable) can be dropped.

It is to be appreciated that this particular example pseudocode shows just one example implementation of data preprocessing, and alternative implementations can be used in other embodiments.

FIG. 11 shows example pseudocode for encoding categorical values into numerical values in an illustrative embodiment. In this embodiment, example pseudocode 1100 is executed by or under the control of at least one processing system and/or device. For example, the example pseudocode 1100 may be viewed as comprising a portion of a software implementation of at least part of automated data archiving system 105 of the FIG. 1 embodiment.

The example pseudocode 1100 illustrates encoding categorical values into numerical values using a LabelEncoder function which is a part of a SciKitLearn library, as machine learning models deal with numerical values (and not textual categorical values). For example, database type, transaction type, archival class, etc., can be encoded by using the LabelEncoder function.

It is to be appreciated that this particular example pseudocode shows just one example implementation of encoding categorical values into numerical values, and alternative implementations can be used in other embodiments.

FIG. 12 shows example pseudocode for reducing dimensionality of a dataset in an illustrative embodiment. In this embodiment, example pseudocode 1200 is executed by or under the control of at least one processing system and/or device. For example, the example pseudocode 1200 may be viewed as comprising a portion of a software implementation of at least part of automated data archiving system 105 of the FIG. 1 embodiment.

The example pseudocode 1200 illustrates normalizing the dataset by applying scaling techniques, which can be achieved by using a StandardScaler function available in a SciKitLearn library. After normalization, the dataset can be passed to PCA function for dimensionality reduction and rendered ready for model training.

It is to be appreciated that this particular example pseudocode shows just one example implementation of reducing dimensionality of a dataset, and alternative implementations can be used in other embodiments.

FIG. 13 shows example pseudocode for splitting a dataset into training and testing sets in an illustrative embodiment. In this embodiment, example pseudocode 1300 is executed by or under the control of at least one processing system and/or device. For example, the example pseudocode 1300 may be viewed as comprising a portion of a software implementation of at least part of automated data archiving system 105 of the FIG. 1 embodiment.

The example pseudocode 1300 illustrates splitting the dataset into training and testing datasets using a train_test_split function of a SciKitLearn library, using, for example, 70%-30% split. Considering that this is a multi-class classification use case and a dense neural network can be used as the model, one or more embodiments include scaling the data before passing to the model. However, if scaling is performed in connection with PCA (such as detailed above in connection with FIG. 12), there is no need to scale the data again. At the end of these activities, the data are ready for model training and testing.

It is to be appreciated that this particular example pseudocode shows just one example implementation of splitting a dataset into training and testing sets, and alternative implementations can be used in other embodiments.

FIG. 14 shows example pseudocode for creating a dense neural network model for multi-class classification in an illustrative embodiment. In this embodiment, example pseudocode 1400 is executed by or under the control of at least one processing system and/or device. For example, the example pseudocode 1400 may be viewed as comprising a portion of a software implementation of at least part of automated data archiving system 105 of the FIG. 1 embodiment.

The example pseudocode 1400 illustrates creating a multi-layer dense neural network, using a Keras library, to act as a multi-class classifier. Using the function Model( ), the functional model is created, and then individual layers of each branch are added by calling an add( ) function of the model and passing an instance of a Dense( ) function to indicate that it is a dense neural network. Accordingly, all of the neurons in each layer will connect with all of the neurons from preceding and following layers. The Dense( ) function will accept parameters for the number of neurons on the given layer, the type of activation function used and if there are any kernel parameters. Multiple hidden layers and an output layer are added by calling the same add( ) function to the model. Once the model is created, a loss function, an optimizer type, and one or more validation metrics are added to the model using a compile( ) function.

It is to be appreciated that this particular example pseudocode shows just one example implementation of creating a dense neural network model for multi-class classification, and alternative implementations can be used in other embodiments.

Figures 15, 16:
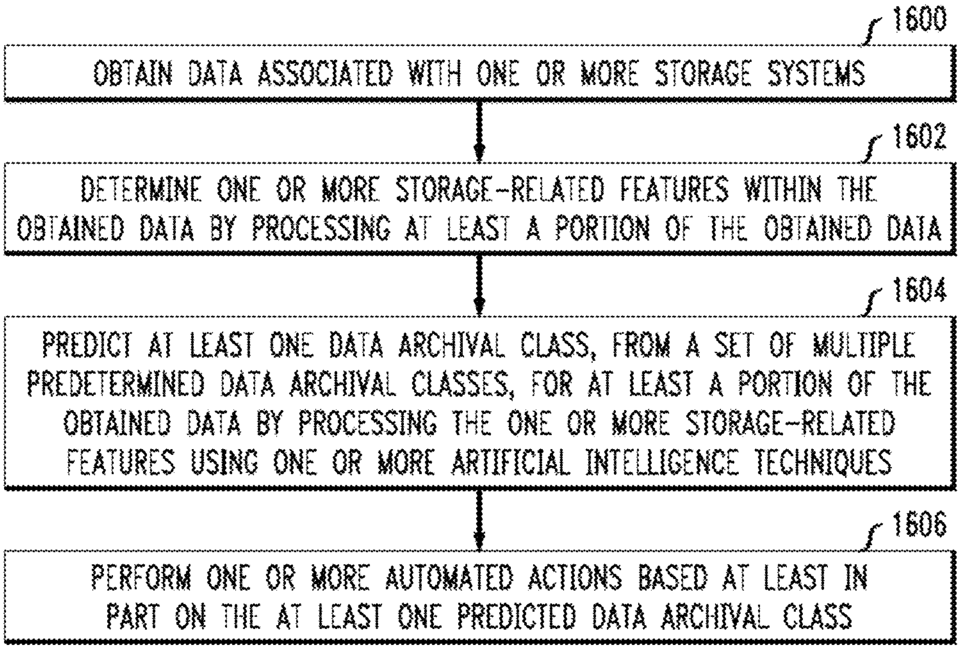
FIG. 15 shows example pseudocode for model training, validation, and prediction in an illustrative embodiment.
FIG. 16 is a flow diagram of a process for implementing an automated data archival framework using artificial intelligence techniques in an illustrative embodiment.

FIG. 15 shows example pseudocode for model training, validation, and prediction in an illustrative embodiment. In this embodiment, example pseudocode 1500 is executed by or under the control of at least one processing system and/or device. For example, the example pseudocode 1500 may be viewed as comprising a portion of a software implementation of at least part of automated data archiving system 105 of the FIG. 1 embodiment.

The example pseudocode 1500 illustrates training the neural network model by calling a fit( ) function of the model and passing training data and the number of epochs. After the model completes the specified number of epochs, the model is trained and ready for validation. The loss or error value can be obtained by calling an evaluate( ) function of the model and passing testing data. This loss or error value indicates how well the model is trained; a higher value indicates that the model is not trained enough (and as such, hyperparameter tuning may be required). In one or more embodiments, the number of epochs can be increased to further train the model. Hyperparameter tuning can be carried out, for example, by changing the loss function, the optimizer algorithm, and/or making changes to the neural network architecture by adding one or more hidden layers, etc. Once the model is trained with a reasonable value of loss (e.g., as close to 0 as possible), the model is ready for prediction. Prediction of the model is achieved by calling a predict( ) function of the model and passing the independent variables of the testing data (e.g., for comparing training versus testing) or the real values that need to be predicted for the archival class type (e.g., the target variable).

It is to be appreciated that this particular example pseudocode shows just one example implementation of model training, validation, and prediction, and alternative implementations can be used in other embodiments.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

FIG. 16 is a flow diagram of a process for implementing an automated data archival framework using artificial intelligence techniques in an illustrative embodiment. It is to be understood that this particular process is only an example, and additional or alternative processes can be carried out in other embodiments.

In this embodiment, the process includes steps 1600 through 1606. These steps are assumed to be performed by automated data archiving system 105 utilizing elements 112, 114 and 116.

Step 1600 includes obtaining data associated with one or more storage systems. Step 1602 includes determining one or more storage-related features within the obtained data by processing at least a portion of the obtained data. In at least one embodiment, determining one or more storage-related features includes identifying, within the obtained data, information pertaining to database type, information pertaining to transaction type, latency information, information related to one or more full table scans, and/or information pertaining to one or more accessed rows.

Step 1604 includes predicting at least one data archival class, from a set of multiple predetermined data archival classes, for at least a portion of the obtained data by processing the one or more storage-related features using one or more artificial intelligence techniques. In one or more embodiments, processing the one or more storage-related features using one or more artificial intelligence techniques includes processing the one or more storage-related features using at least one random forest classifier comprising multiple decision trees, wherein each of the multiple decision trees is constructed in connection with one or more different storage-related features. In such an embodiment, predicting at least one data archival class includes generating multiple data archival class predictions corresponding to the multiple decision trees, and determining a final data archival class, from among the multiple data archival class predictions, by implementing a voting mechanism across the multiple data archival class predictions. Additionally, in such an embodiment, processing the one or more storage-related features using at least one random forest classifier can include processing the one or more storage-related features using at least one random forest classifier in conjunction with one or more ensemble bagging techniques.

Additionally or alternatively, in one or more embodiments, processing the one or more storage-related features using one or more artificial intelligence techniques includes processing the one or more storage-related features using at least one dense artificial neural network-based-based classifier comprising an input layer, one or more hidden layers, and an output layer. In such an embodiment, the input layer includes a number of neurons matching a number of storage-related features, and the output layer includes a number of neurons matching a number of data archival classes.

Step 1606 includes performing one or more automated actions based at least in part on the at least one predicted data archival class. In at least one embodiment, performing one or more automated actions includes automatically archiving the at least a portion of the obtained data in accordance with the at least one predicted data archival class. In such an embodiment, automatically archiving the at least a portion of the obtained data can include migrating the at least a portion of the obtained data in accordance with the at least one predicted data archival class, replicating the at least a portion of the obtained data in accordance with the at least one predicted data archival class, and/or removing the at least a portion of the obtained data from the one or more storage systems in accordance with the at least one predicted data archival class.

Additionally or alternatively, in at least one embodiment, performing one or more automated actions includes automatically training the one or more artificial intelligence techniques using feedback related to the at least one predicted data archival class. Also, in one or more embodiments, the one or more artificial intelligence techniques are trained using one or more storage-related policies and historical data pertaining to data archiving.

Accordingly, the particular processing operations and other functionality described in conjunction with the flow diagram of FIG. 16 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement an automated data archival framework using artificial intelligence techniques. These and other embodiments can effectively overcome problems associated with resource-intensive and error-prone processes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux® Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 17 and 18. Although described in the context of system 100, these platforms may also be used to implement at least portions of other information processing systems in other embodiments.

Figure 17:
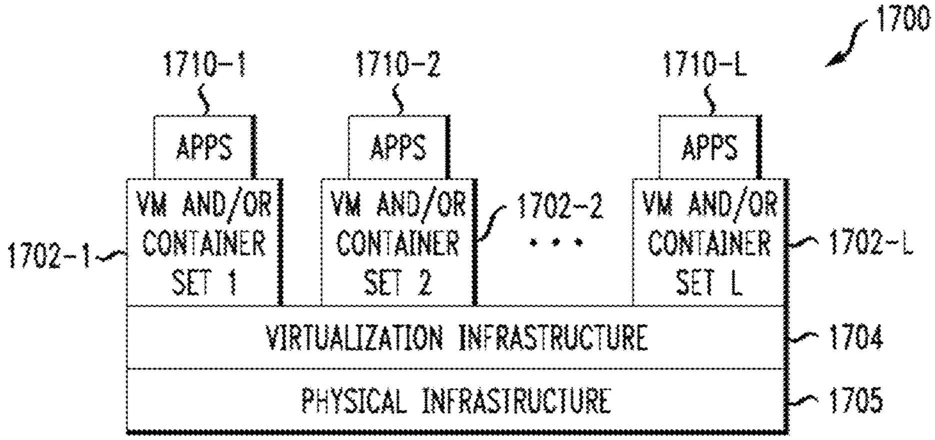
FIGS. 17 and 18 show examples of processing platforms that may be utilized to implement at least a portion of an information processing system in illustrative embodiments.
Figure 18:
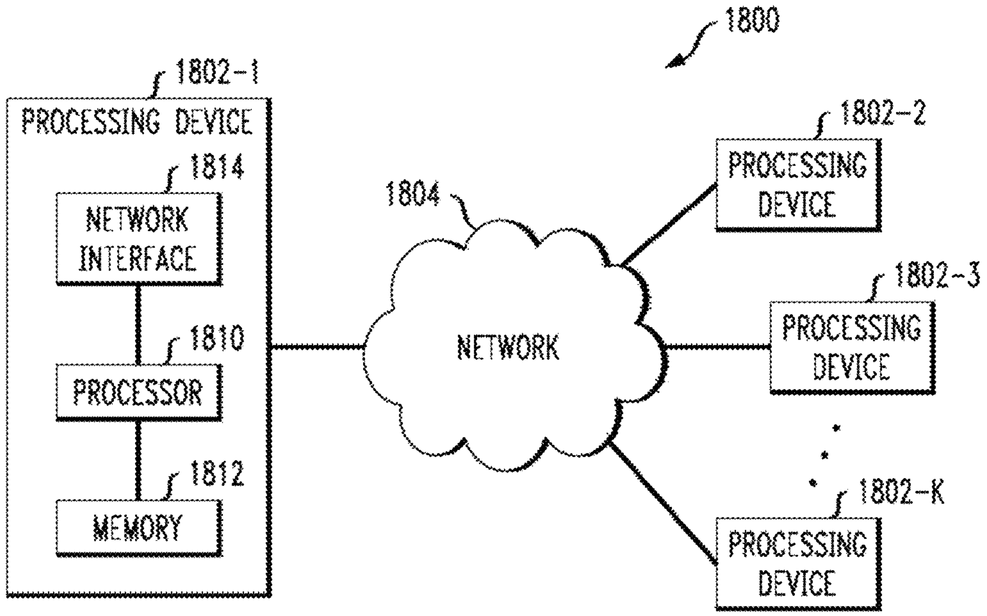

FIG. 17 shows an example processing platform comprising cloud infrastructure 1700. The cloud infrastructure 1700 comprises a combination of physical and virtual processing resources that are utilized to implement at least a portion of the information processing system 100. The cloud infrastructure 1700 comprises multiple virtual machines (VMs) and/or container sets 1702-1, 1702-2, . . . 1702-L implemented using virtualization infrastructure 1704. The virtualization infrastructure 1704 runs on physical infrastructure 1705, and illustratively comprises one or more hypervisors and/or operating system level virtualization infrastructure. The operating system level virtualization infrastructure illustratively comprises kernel control groups of a Linux® operating system or other type of operating system.

The cloud infrastructure 1700 further comprises sets of applications 1710-1, 1710-2, . . . 1710-L running on respective ones of the VMs/container sets 1702-1, 1702-2, . . . 1702-L under the control of the virtualization infrastructure 1704. The VMs/container sets 1702 comprise respective VMs, respective sets of one or more containers, or respective sets of one or more containers running in VMs. In some implementations of the FIG. 17 embodiment, the VMs/container sets 1702 comprise respective VMs implemented using virtualization infrastructure 1704 that comprises at least one hypervisor.

A hypervisor platform may be used to implement a hypervisor within the virtualization infrastructure 1704, wherein the hypervisor platform has an associated virtual infrastructure management system. The underlying physical machines comprise one or more information processing platforms that include one or more storage systems.

In other implementations of the FIG. 17 embodiment, the VMs/container sets 1702 comprise respective containers implemented using virtualization infrastructure 1704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 comprises any type of network, including by way of example a global computer network such as the Internet, a WAN, a LAN, a satellite network, a telephone or cable network, a cellular network, a wireless network such as a Wi-Fi® or WiMAX® network, or various portions or combinations of these and other types of networks.

The processing device 1802-1 in the processing platform 1800 comprises a processor 1810 coupled to a memory 1812.

The processor 1810 comprises a microprocessor, a CPU, a GPU, a TPU, a microcontroller, an ASIC, a FPGA or other type of processing circuitry, as well as portions or combinations of such circuitry elements.

The memory 1812 comprises random access memory (RAM), read-only memory (ROM) or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining data associated with one or more storage systems;

determining one or more storage-related features within the obtained data by processing at least a portion of the obtained data;

predicting, in an artificial neural network-based classifier model of a processor-based machine learning system, two or more data archival classes, from a set of multiple predetermined data archival classes associated with multiple designations of data access frequency, for at least a portion of the obtained data, the artificial neural network-based classifier model, trained using one or more storage-related policies and historical data pertaining to data archiving, having an architectural arrangement comprising: (i) an input layer including a number of neurons matching a number of storage-related features comprising at least the one or more storage-related features, (ii) multiple hidden layers, each including a first type of activation function and a number of neurons determined based at least in part on the number of neurons in the input layer, and (iii) an output layer including a second type of activation function different from the first type of activation function, and a number of neurons matching a number of data archival classes in the set of multiple predetermined data archival classes, wherein the input layer, the multiple hidden layers, and the output layer are connected, in series, within the artificial neural network-based classifier model;

migrating at least a first part of the at least a portion of the obtained data to a first storage system associated with a first of the two or more predicted data archival classes; and replicating at least a second part of the at least a portion of the obtained data in a second storage system associated with a second of the two or more predicted data archival classes;

wherein the method is performed by at least one processing device comprising a processor coupled to a memory.

2. The computer-implemented method of claim 1, wherein predicting two or more data archival classes comprises processing the one or more storage-related features using at least one random forest classifier comprising multiple decision trees, wherein each of the multiple decision trees is constructed in connection with one or more different storage-related features.

3. The computer-implemented method of claim 2, wherein predicting two or more data archival classes comprises generating multiple data archival class predictions corresponding to the multiple decision trees, and determining a final data archival class, from among the multiple data archival class predictions, by implementing a voting mechanism across the multiple data archival class predictions.

4. The computer-implemented method of claim 2, wherein processing the one or more storage-related features using at least one random forest classifier comprises processing the one or more storage-related features using at least one random forest classifier in conjunction with one or more ensemble bagging techniques.

5. The computer-implemented method of claim 1, further comprising:

removing at least a third part of the at least a portion of the obtained data from the one or more storage systems in accordance with the two or more predicted data archival classes.

6. The computer-implemented method of claim 1, further comprising:

automatically training the artificial neural network-based classifier model using feedback related to the two or more predicted data archival classes.

7. The computer-implemented method of claim 1, wherein determining one or more storage-related features comprises identifying, within the obtained data, one or more of information pertaining to database type, information pertaining to transaction type, latency information, information related to one or more full table scans, and information pertaining to one or more accessed rows.

8. A non-transitory processor-readable storage medium having stored therein program code of one or more software programs, wherein the program code when executed by at least one processing device causes the at least one processing device:

to obtain data associated with one or more storage systems;

to determine one or more storage-related features within the obtained data by processing at least a portion of the obtained data;

to predict, in an artificial neural network-based classifier model of a processor-based machine learning system, two or more data archival classes, from a set of multiple predetermined data archival classes associated with multiple designations of data access frequency, for at least a portion of the obtained data, the artificial neural network-based classifier model, trained using one or more storage-related policies and historical data pertaining to data archiving, having an architectural arrangement comprising: (i) an input layer including a number of neurons matching a number of storage-related features comprising at least the one or more storage-related features, (ii) multiple hidden layers, each including a first type of activation function and a number of neurons determined based at least in part on the number of neurons in the input layer, and (iii) an output layer including a second type of activation function different from the first type of activation function, and a number of neurons matching a number of data archival classes in the set of multiple predetermined data archival classes, wherein the input layer, the multiple hidden layers, and the output layer are connected, in series, within the artificial neural network-based classifier model;

to migrate at least a first part of the at least a portion of the obtained data to a first storage system associated with a first of the two or more predicted data archival classes; and to replicate at least a second part of the at least a portion of the obtained data in a second storage system associated with a second of the two or more predicted data archival classes.

9. The non-transitory processor-readable storage medium of claim 8, wherein predicting two or more data archival classes comprises processing the one or more storage-related features using at least one random forest classifier comprising multiple decision trees, wherein each of the multiple decision trees is constructed in connection with one or more different storage-related features.

10. The non-transitory processor-readable storage medium of claim 9, wherein predicting two or more data archival classes comprises generating multiple data archival class predictions corresponding to the multiple decision trees, and determining a final data archival class, from among the multiple data archival class predictions, by implementing a voting mechanism across the multiple data archival class predictions.

11. The non-transitory processor-readable storage medium of claim 9, wherein processing the one or more storage-related features using at least one random forest classifier comprises processing the one or more storage-related features using at least one random forest classifier in conjunction with one or more ensemble bagging techniques.

12. The non-transitory processor-readable storage medium of claim 8, wherein the program code when executed by the at least one processing device further causes the at least one processing device:

to automatically train the artificial neural network-based classifier model using feedback related to the two or more predicted data archival classes.

13. The non-transitory processor-readable storage medium of claim 8, wherein the program code when executed by the at least one processing device further causes the at least one processing device:

to remove at least a third part of the at least a portion of the obtained data from the one or more storage systems in accordance with the two or more predicted data archival classes.

14. An apparatus comprising:

at least one processing device comprising a processor coupled to a memory;

the at least one processing device being configured:

to obtain data associated with one or more storage systems;

to determine one or more storage-related features within the obtained data by processing at least a portion of the obtained data;

to predict, in an artificial neural network-based classifier model of a processor-based machine learning system, two or more data archival classes, from a set of multiple predetermined data archival classes associated with multiple designations of data access frequency, for at least a portion of the obtained data, the artificial neural network-based classifier model, trained using one or more storage-related policies and historical data pertaining to data archiving, having an architectural arrangement comprising: (i) an input layer including a number of neurons matching a number of storage-related features comprising at least the one or more storage-related features, (ii) multiple hidden layers, each including a first type of activation function and a number of neurons determined based at least in part on the number of neurons in the input layer, and (iii) an output layer including a second type of activation function different from the first type of activation function, and a number of neurons matching a number of data archival classes in the set of multiple predetermined data archival classes, wherein the input layer, the multiple hidden layers, and the output layer are connected, in series, within the artificial neural network-based classifier model;

to migrate at least a first part of the at least a portion of the obtained data to a first storage system associated with a first of the two or more predicted data archival classes; and to replicate at least a second part of the at least a portion of the obtained data in a second storage system associated with a second of the two or more predicted data archival classes.

15. The apparatus of claim 14, wherein predicting two or more data archival classes comprises processing the one or more storage-related features using at least one random forest classifier comprising multiple decision trees, wherein each of the multiple decision trees is constructed in connection with one or more different storage-related features.

16. The apparatus of claim 15, wherein predicting two or more data archival classes comprises generating multiple data archival class predictions corresponding to the multiple decision trees, and determining a final data archival class, from among the multiple data archival class predictions, by implementing a voting mechanism across the multiple data archival class predictions.

17. The apparatus of claim 15, wherein processing the one or more storage-related features using at least one random forest classifier comprises processing the one or more storage-related features using at least one random forest classifier in conjunction with one or more ensemble bagging techniques.

18. The apparatus of claim 14, wherein the at least one processing device is further configured:

to automatically train the artificial neural network-based classifier model using feedback related to the two or more predicted data archival classes.

19. The apparatus of claim 14, wherein determining one or more storage-related features comprises identifying, within the obtained data, one or more of information pertaining to database type, information pertaining to transaction type, latency information, information related to one or more full table scans, and information pertaining to one or more accessed rows.

20. The apparatus of claim 14, wherein the at least one processing device is further configured:

to remove at least a third part of the at least a portion of the obtained data from the one or more storage systems in accordance with the two or more predicted data archival classes.

* * * * *